Patented June 3, 1947

2,421,559

UNITED STATES PATENT OFFICE 2,421,559

ACETALS OF PYRUVIC ALDEHYDE

Howard R. Guest, Charleston, W. Va., Louis G. MacDowell, Lakeland, Fla., and Raymond W. McNamee, South Charleston, W. Va., assignors to Carbide and Carbon Chemicals Corporation, a corporation of New York No Drawing. Application January 14, 1944, Serial No. 518,304

4 Claims. (Cl. 260—594)

An improved process for the production of the di-acetals of pyruvic aldehyde, $H_3CCOCHO$, with monohydric alcohols is the subject of this invention. Certain of these acetals are new chemical compounds, having valuable properties as solvents and as intermediates in chemical syntheses.

Harries and Turk, Ber. 38, 1633, prepared the diethyl acetal of pyruvic aldehyde in an unsatisfactory yield by permitting a mixture of pyruvic aldehyde and a 2% solution of hydrochloric acid in ethanol to stand for three days. Apparently, the work of Harries and Turk represented the sole attempt of the prior art to prepare these acetals employing pyruvic aldehyde, or its polymers, as the starting material, since subsequent investigators have resorted to other methods. Wohl and Lange, Ber. 41, 3615, prepared pyruvic aldehyde diethyl acetal by a Grignard synthesis involving the action of methyl magnesium iodide on diethoxyacetopiperamide. Subsequently, Wohl and Momber, Ber. 47, 3356, prepared the dimethyl acetal of pyruvic aldehyde, in addition to the dimethyl acetal of glycerine aldehyde, by the reduction of $\alpha$-hydroxy-$\beta$-aminopropionaldehyde dimethyl acetal with nitrous acid. At about the same time, Dakin and Dudley, J. Chem. Soc. 105, 2456, prepared the diethyl acetal by the decarboxylation of $\gamma,\gamma$-diethoxy ethylacetoacetate with aqueous sodium hydroxide.

According to this invention, the di-acetals of pyruvic aldehyde with monohydric alcohols are prepared by heating the alcohol and the aldehyde, preferably in the presence of an acid catalyst, and removing the water formed in the reaction under controlled conditions. The general reaction which occurs may be represented as follows:

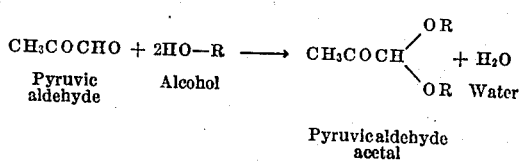

where R is the residue of any monohydric alcohol.

While many methods of water removal in organic condensation involve the use of temperatures above 100° C., the boiling point of water, in the present process it has been found essential to maintain the reaction mixture at a temperature between about 50° C. and about 100° C., during removal of a substantial part of the water formed in the acetalization of the pyruvic aldehyde. Toward the end of the reaction, however, a slight rise in the temperature of the reaction mixture is not detrimental. Temperature control is essential in the present invention to prevent the rearrangement of at least a substantial part of the pyruvic aldehyde di-acetal to esters of $\alpha$-alkoxypropionic acid according to the following scheme:

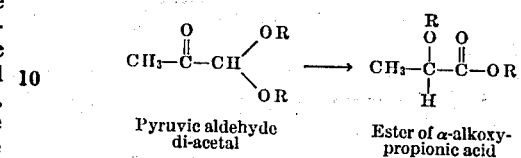

Pyruvic aldehyde di-acetal     Ester of $\alpha$-alkoxy-propionic acid

This molecular rearrangement occurs at temperatures above 100° C., and most readily at about 135° C., in the presence of the acid catalyst and an excess of the alcohol, as particularly described and claimed in our continuation-in-part application Serial No. 542,442, filed June 27, 1944.

The $\alpha$-alkoxypropionic acid esters have boiling points which are very close to those of the corresponding di-acetals of pyruvic aldehyde, and it is therefore very difficult to separate the esters from the acetals by fractional distillation.

Control of the temperature of reaction is also important to inhibit side reactions, such as the formation of pyruvic aldehyde di-acetals di-ketals, which occurs at temperatures above 100° C.

The substantial bulk of the water of acetalization may be removed from the reaction mixture at temperatures below 100° C. by two methods. The most important of these methods involves the removal of the water of reaction as an azeotropic distillate with a water-immiscible, inert organic liquid boiling below 100° C. Such liquids include benzene, diisopropyl ether, ethyl acetate, and ethylene dichloride. Another method involves the distillation of the water of reaction under reduced pressure.

The process of this invention produces in a matter of hours a high yield of the desired pyruvic aldehyde di-acetals, uncontaminated with difficultly removable products of side reactions. A valuable characteristic of the present invention is that a good yield of the di-acetal is obtained starting with crude pyruvic aldehyde, which contains water and small amounts of monoaldehydes, such as may result from the oxidation of propylene glycol. The pyruvic aldehyde may be in monomeric form, or in the form of its hydrates, polymers, or hydrated polymers.

The pyruvic aldehyde di-acetals which are new chemical compounds are those which have boiling points of at least 92.5° C. at 50 mm. The more useful of such materials may be included in the formula,

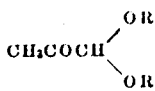

where R is an alkyl, chloralkyl, or alkoxyalkyl radical having a combined atomic weight of at least 43. As specific instances of such compounds there may be mentioned the pyruvic aldehyde di-acetals of the monohydric alkyl alcohols having at least three carbon atoms, such as isopropanol, butanol, 2-ethylhexanol, lauryl alcohol, cyclohexanol, and secondary branched-chain alcohols, such as 5-ethylnonanol-2, 7-ethyl-2-methylundecanol-4, and 3,9-diethyltridecanol-6; the pyruvic aldehyde di-acetals of chloralkanols, such as beta-chlorethyl alcohol and beta-chlorisopropyl alcohol; and the pyruvic aldehyde di-acetals of alkoxyalcohols, such as methoxyethanol, butoxyethanol and butoxyethoxyethanol. These new di-acetals contain both keto and ether groups, and the lower members of the series are useful as solvents for oils, fats, resins, waxes, and cellulose derivatives. They are colorless and limpid and they have a pleasant odor.

The following examples will illustrate the invention:

Example 1

Nine hundred (900) grams of an aqueous solution of pyruvic aldehyde containing approximately 70% pyruvic aldehyde and 10% formaldehyde were heated with 2220 grams of butanol, 1500 cc. of benzene and 2 cc. of concentrated sulfuric acid. The temperature was maintained at about 85° C. and the major portion of the water initially present and that evolved in the reaction were distilled as a mixture of the azeotropes of water with butanol and benzene. The distillate was condensed and the water separated from the butanol and benzene by decantation. The butanol and benzene were returned to the reaction. After about 300 cc. of water were removed, the reaction was complete and the kettle temperature then rose to about 104° C. After neutralization of the catalyst with sodium acetate, the reaction mixture was fractionally distilled. After removal of some lower boiling formals, the main portion of the reaction product was removed as a fraction boiling at 103° C. at 10 mm. and possessing a specific gravity of 0.905 at 20° C. A 75% yield of pyruvic aldehyde dibutyl acetal was obtained, which was approximately 100% pure as determined by the hydroxylamine method. A small amount of pyruvic aldehyde dibutyl acetal dibutyl ketal was also obtained. Purified pyruvic aldehyde dibutyl acetal possesses the following properties: boiling point 103° C. at 10 mm., specific gravity 0.905 at 20° C., refractive index 1.4180 at 20° C., molecular refraction observed 56.3, calculated 56.3.

For comparison, 900 grams of the same pyruvic aldehyde solution were refluxed with 2960 grams of butanol and 2 cc. of sulfuric acid. The water initially present and that evolved in the reaction were distilled as the azeotropic mixture with butanol, and the butanol returned to the reaction after separation of the water by condensation and decantation. At the end of the reaction, the kettle temperature was approximately 135° C. After neutralization of the catalyst with sodium acetate, the mixture was distilled. The first fraction removed consisted of the excess butanol and some dibutyl formal, followed by a fraction boiling at 100° to 105° C. at 10 mm. The amount of this fraction calculated as pyruvic aldehyde dibutyl acetal indicated that about 80% of the pyruvic aldehyde charged had been converted to this fraction. However, when the fraction was analyzed by alkaline saponification, it was found to contain 40% of the butyl ester of alpha-butoxy propionic acid. In addition, a larger amount of pyruvic aldehyde dibutyl acetal dibutyl ketal was obtained than in the preceding experiment.

Example 2

Ninety (90) grams of the aqueous pyruvic aldehyde solution described above were refluxed with 744 grams of lauryl alcohol, 1000 cc. of benzene and 2 cc. of concentrated sulfuric acid. The kettle temperature was kept below 90° C. at all times and the water was removed principally as the azeotropic distillate with benzene, the benzene being decanted from the water and returned to the reaction. After 32 cc. of water were obtained, the reaction was completed, and the catalyst was neutralized with sodium acetate and the reaction mixture distilled. A 94% yield of pyruvic aldehyde dilauryl acetal was obtained. This material possessed the following properties: boiling point 218° C. at 1.4 mm., specific gravity 0.866 at 20° C., refractive index 1.4468 at 20° C., molecular refraction observed 131.3, calculated 130.2.

Examples 3 to 6

In a similar manner as described in Examples 1 and 2, the following new pyruvic aldehyde di-acetals were prepared:

| | Boiling Point | Specific Gravity at 20° C. | Refractive Index at 20° C. | Molecular Refraction | |
|---|---|---|---|---|---|
| | | | | Calc. | Obsd. |
| Pyruvic aldehyde di-isopropyl acetal | 92.5°/C. at 50 mm | 0.900 | 1.4034 | 47.06 | 47.20 |
| Pyruvic aldehyde di(2-ethyl hexyl) acetal | 138-141° C. at 1.3-1.4 mm | 0.883 | 1.4369 | 93.25 | 93.28 |
| Pyruvic aldehyde dimethoxyethyl acetal | 126.5° C. at 10 mm | 1.048 | 1.4278 | 50.35 | 50.60 |
| Pyruvic aldehyde di(β-chlorethyl) acetal | 106° C. at 2 mm | 1.244 | 1.4610 | 47.46 | 47.45 |

Modifications of the invention other than as described in the foregoing examples will be apparent to those skilled in the art, and such modifications are included within the scope of the claims.

We claim:

1. Process for making di-acetals of pyruvic aldehyde with monohydric alcohols which comprises heating a mixture of pyruvic aldehyde, a monohydric alcohol, an inert, water-immiscible organic liquid boiling below 100° C., and an acid catalyst, distilling water from the mixture as the reaction progresses at a temperature between about 50° C. and about 100° C., and recovering a substantially pure di-acetal of pyruvic aldehyde from the reaction mixture by fractional distillation.

2. Process for making di-acetals of pyruvic aldehyde with an aliphatic alcohol having at least three carbon atoms which comprises heating a mixture of pyruvic aldehyde, said alcohol, an inert, water-immiscible organic liquid boiling below 100° C., and an acid catalyst, distilling water from the mitxure as the reaction progresses at a temperature between about 50° C. and about 100° C., and recovering a substantially pure di-acetal of pyruvic aldehyde from the reaction mixture by fractional distillation.

3. Process for making di-acetals of pyruvic aldehyde with chloralkanols which comprises heating a mixture of pyruvic aldehyde, a chloralkanol, an inert, water-immiscible organic liquid boiling below 100° C., and an acid catalyst, distilling water from the mixture as the reaction progresses at a temperature between about 50° C. and about 100° C., and recovering a substantially pure di-acetal of pyruvic aldehyde from the reaction mixture by fractional distillation.

4. Process for making di-acetals of pyruvic aldehyde with alkoxyalcohols which comprises heating a mixture of pyruvic aldehyde, an alkoxyalcohol, an inert, water-immiscible organic liquid boiling below 100° C., and an acid catalyst, distilling water from the mixture as the reaction progresses at a temperature between about 50° C. and about 100° C., and recovering a substantially pure di-acetal of pyruvic aldehyde from the reaction mixture by fractional distillation.

HOWARD R. GUEST.
LOUIS G. MacDOWELL.
RAYMOND W. McNAMEE.

REFERENCES CITED

The following references are of record in the file of this patent:

UNITED STATES PATENTS

| Number | Name | Date |
|---|---|---|
| 1,850,836 | Guinot | Dec. 29, 1927 |
| 2,321,094 | MacDowell | June 8, 1943 |

OTHER REFERENCES

Harries et al., Ber. Deut. Chem., vol. 38, p. 1633 (1906).